US011942107B2

(12) United States Patent
Rivolta et al.

(10) Patent No.: US 11,942,107 B2
(45) Date of Patent: Mar. 26, 2024

(54) VOICE ACTIVITY DETECTION WITH LOW-POWER ACCELEROMETER

(71) Applicant: STMICROELECTRONICS S.r.l., Agrate Brianza (IT)

(72) Inventors: Stefano Paolo Rivolta, Desio (IT); Federico Rizzardini, Settimo Milanese (IT); Lorenzo Bracco, Chivasso (IT); Roberto Mura, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 139 days.

(21) Appl. No.: 17/183,288

(22) Filed: Feb. 23, 2021

(65) Prior Publication Data

US 2022/0270593 A1 Aug. 25, 2022

(51) Int. Cl.
*G10L 25/78* (2013.01)
*G06N 5/01* (2023.01)
*G06N 20/10* (2019.01)
*G10L 25/09* (2013.01)
*G10L 25/30* (2013.01)
*G10L 25/51* (2013.01)
(Continued)

(52) U.S. Cl.
CPC ............... *G10L 25/78* (2013.01); *G06N 5/01* (2023.01); *G06N 20/10* (2019.01); *G10L 25/09* (2013.01); *G10L 25/30* (2013.01); *G10L 25/51* (2013.01); *H04R 25/40* (2013.01); *H04R 25/505* (2013.01); *H04R 25/604* (2013.01); *G10L 15/16* (2013.01); *G10L 19/26* (2013.01)

(58) Field of Classification Search
None
See application file for complete search history.

(56) References Cited

U.S. PATENT DOCUMENTS 9,196,261 B2 11/2015 Burnett et al.
9,313,572 B2 4/2016 Dusan et al.
(Continued)

FOREIGN PATENT DOCUMENTS

CN 111916101 A 11/2020
WO WO-2020034104 A1 * 2/2020
WO WO-2022168365 A1 * 8/2022 ........... G10K 11/178

OTHER PUBLICATIONS

Saurav Dubey, Arash Mahnan, Jürgen Konczak; Real-Time Voice Activity Detection Using Neck-Mounted Accelerometers; https://watermark.silverchair.com/v001t09a007-dmd2020-9081.pdf?token=AQECAHi208BE49Ooan9kkhW_Ercy7Dm3ZL_9Cf3qfKAc485ysgAABDwwggQ4BgkqhkiG9w0BBwagggQpMIIEJQIBADCCBB4GCSqGSIb3DQEHATAeBg (Year: 2020).*

(Continued)

*Primary Examiner* — Richa Sonifrank
(74) *Attorney, Agent, or Firm* — Seed IP Law Group LLP

(57) ABSTRACT

The present disclosure is directed to a device and method for detecting presence or absence of human speech. The device and method utilize a low-power accelerometer. The device and method generate an acceleration signal using the accelerometer, filter the acceleration signal with a band pass filter or a high pass filter, determine at least one calculation of the filtered acceleration signal, detect a presence or absence of a voice based on the at least one calculation, and output a detection signal that indicates the presence or absence of the voice. The device and method are well suited for portable audio devices, such as true wireless stereo headphones, that have a limited power supply.

14 Claims, 3 Drawing Sheets

(51) Int. Cl.
  *H04R 25/00* (2006.01)
  *G10L 15/16* (2006.01)
  *G10L 19/26* (2013.01)

(56) References Cited

U.S. PATENT DOCUMENTS

| | | | |
|---|---|---|---|
| 9,516,442 B1 | 12/2016 | Dusan et al. | |
| 2015/0154981 A1 | 6/2015 | Barreda et al. | |
| 2017/0092297 A1 | 3/2017 | Sainath et al. | |
| 2019/0045298 A1* | 2/2019 | Klemme | G10L 21/0208 |
| 2020/0069281 A1* | 3/2020 | Chan | H04R 29/00 |
| 2021/0382972 A1* | 12/2021 | Littrell | G10L 17/04 |
| 2022/0005495 A1* | 1/2022 | Scheiermann | G01H 1/00 |
| 2023/0116597 A1* | 4/2023 | Yamamoto | H04R 1/1008 381/71.2 |

OTHER PUBLICATIONS

Dubey, "Accelerometer-based real-time voice activity detection using neck surface vibration measurement," Thesis, Master of Science, University of Minnesota, Jun. 2019. (54 pages).

Dubey et al., "Real-Time Voice Activity Detection Using Neck-Mounted Accelerometers for Controlling a Wearable Vibration Device to Treat Speech Impairment," *2020 Design Medical Devices Conference*, MN, USA, Apr. 6-9, 2020. (7 pages).

Matic et al., "Speech Activity Detection using Accelerometer," *34th Annual International Conference of the IEEE EMBS*, San Diego, CA, USA, Aug. 28-Sep. 1, 2012, pp. 2112-2115.

STMicroelectronics, "LSM6DSOX: Machine Learning Core", AN5259, Revision 4, Aug. 2020, 67 pages.

* cited by examiner

VOICE ACTIVITY DETECTION WITH LOW-POWER ACCELEROMETER

TECHNICAL FIELD

The present disclosure is directed to a device and method for detecting voice activity.

DESCRIPTION OF THE RELATED ART

Many audio headsets, such as true wireless stereo (TWS) headphones and gaming headsets, detect a user's voice in addition to playing audio. For example, many TWS headphones function as both a telephone headset for phone calls and an audio playback device for playing media (e.g., music).

When detecting the user's voice, the quality of the user's voice often suffers from environmental noise. In order to minimize the impact of environmental noise on the user's voice, many headsets include voice activity detection (VAD) to detect the presence or absence of human speech, and perform noise cancelling or suppression techniques in response to detecting the presence of human speech. As a result, the quality of the user's voice is improved during, for example, telephone calls.

BRIEF SUMMARY

The present disclosure is directed to a device and method for performing voice activity detection (VAD) to detect the presence or absence of human speech. Instead of utilizing a microphone and/or a bone conduction accelerometer to perform VAD, the device and method utilize a low-power accelerometer. The device and method generate an acceleration signal using the accelerometer, filter the acceleration signal with a band pass filter or a high pass filter, determine at least one calculation of the filtered acceleration signal, and detect a presence or absence of a voice based on the at least one calculation.

The overall current consumption of the device disclosed herein is greatly reduced compared to audio devices that utilize a microphone and/or a bone conduction accelerometer to perform VAD. As such, the device and method disclosed herein are well suited for portable audio devices, such as true wireless stereo headphones, that have a limited power supply.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

Figure 1:
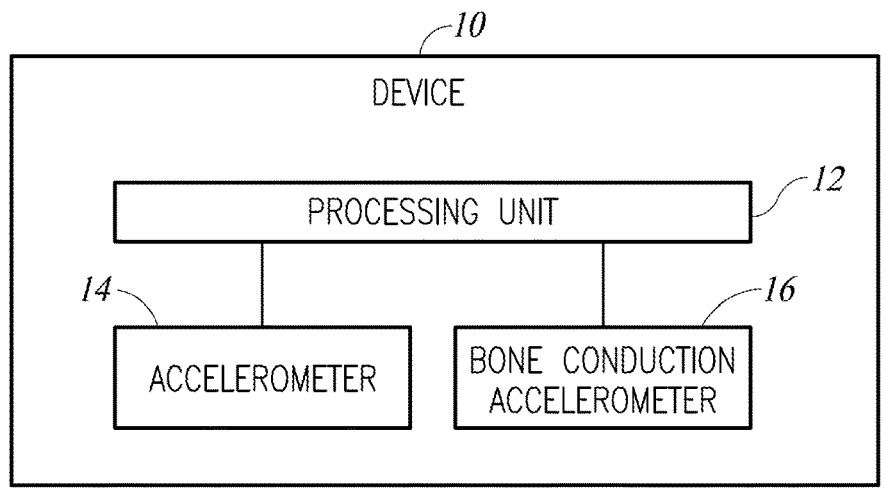
FIG. 1 is a block diagram of a device according to an embodiment disclosed herein.

In the following description, certain specific details are set forth in order to provide a thorough understanding of various aspects of the disclosed subject matter. However, the disclosed subject matter may be practiced without these specific details. In some instances, well-known machine learning techniques and structures and methods of manufacturing electronic devices and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, many audio headsets include voice activity detection (VAD) to detect the presence or absence of human speech. Audio headsets typically implement VAD using a microphone and/or a bone conduction accelerometer. For example, a user's voice may be detected by a microphone as acoustic signals propagating through air, and by a bone conduction accelerometer as bone vibration signals propagating through the human body (e.g., bone and tissue vibrations through the jaw or ear canal). The detected acoustic signals and bone vibration signals are synchronized using, for example, time-division multiplexing (TDM). The audio headset then detects the presence or absence of the user's voice based on the synchronized acoustic signals and bone vibration signals.

VAD techniques that utilize a microphone and/or a bone conduction accelerometer typically involve processing large amounts of data for detected acoustic signals and bone vibration signals at a high rate. For example, each of the microphone and the bone conduction accelerometer may have a data rate between 2 kilohertz and 32 kilohertz, and the microcontroller may process data every 1 millisecond. Consequently, VAD techniques consume large amounts of power, and are, thus, often unsuitable for portable audio devices, such as true wireless stereo (TWS) headphones, that have a limited power supply. For example, a microphone typically consumes between 120 microamps and 700 microamps, a bone conduction accelerometer typically consumes between 1.68 milliamps and 3.3 milliamps, and a microcontroller for controlling the microphone and the bone conduction accelerometer typically consumes between 3 milliamps and 5 milliamps.

The present disclosure is directed to a device and method for performing VAD. The presence or absence of human speech is detected using a low-cost, low-power accelerometer, instead of a microphone and/or a bone conduction accelerometer used in current audio headsets. As a result, the overall current consumption of the device disclosed herein is greatly reduced compared to devices that utilize a microphone and/or a bone conduction accelerometer for VAD. As such, the device and method disclosed herein are ideal for portable audio devices, such as TWS headphones.

FIG. 1 is a block diagram of a device 10 according to an embodiment disclosed herein. The device 10 may be any type of audio headset that detects a user's voice. For example, the device 10 may be TWS headphones, a gaming headset, a telephone headset, etc. The device 10 includes a processing unit 12, an accelerometer 14, and a bone conduction accelerometer 16. The device 10 may also include other components, such as a microphone for capturing voice signals.

The processing unit 12 is, for example, a processor, controller, signal processor, or microcontroller that controls and processes various functions of the device 10. The processing unit 12 controls and coordinates the hardware components (e.g., the accelerometer 14 and the bone conduction accelerometer 16) of the device 10, and any features or applications of the device 10 (e.g., a pedometer, gesture recognition, activity recognition, tap detection, etc.). The processing unit 12 also gathers and processes data from the hardware components of the device 10 (e.g., acoustic signals generated by a microphone, bone vibration signals generated by the bone conduction accelerometer 16, and acceleration signals generated by the accelerometer 14).

The accelerometer 14 is communicatively coupled to the processing unit 12. The accelerometer 14 measures acceleration of the device 10, and generates an acceleration signal that indicates measured accelerations. The accelerometer 14 includes sensing circuitry configured to measure acceleration of the device 10 along at least one axis. In one embodiment, the accelerometer measures acceleration along three axes. As will be discussed in further detail below, the accelerometer 14 also includes control or processing circuitry configured to detect a user's voice as bone vibration signals propagating through the human body (e.g., bone and tissue vibrations through the jaw or ear canal) for VAD.

The bone conduction accelerometer 16 is communicatively coupled to the processing unit 12. In another embodiment, the bone conduction accelerometer 16 is communicatively coupled to the accelerometer 14. The bone conduction accelerometer 16 is similar to the accelerometer 14. For example, the bone conduction accelerometer 16 measures acceleration of the device 10, and generates an acceleration signal that indicates measured accelerations. However, in contrast to the accelerometer 14, the bone conduction accelerometer 16 is specialized to detect a user's voice as bone vibration signals propagating through the human body. The bone conduction accelerometer 16 processes data at a high rate (e.g., between 2 kilohertz and 32 kilohertz), and typically includes a TDM interface to, for example, synchronize with acoustic signals detected by a microphone. Consequently, as discussed above, the bone conduction accelerometer 16 consumes large amounts of power (e.g., consumes between 1.68 milliamps and 3.3 milliamps).

In contrast, the accelerometer 14 is a conventional accelerometer that is both low-cost and low-power. The accelerometer 14 is not a bone conduction accelerometer that is specialized to detect a user's voice as bone vibration signals propagating through the human body. Rather, the accelerometer 14 is used to implement other applications of the device 10, such as a pedometer, gesture recognition, activity recognition, and tap detection. Compared to the bone conduction accelerometer 16, the accelerometer 14 has a low data rate and does not consume large amounts of power. For example, the accelerometer 14 can have a data rate between 600 hertz and 1000 hertz, and consume between 150 microamps and 200 microamps.

The accelerometer 14, itself, detects the presence or absence of human speech. Stated differently, the steps or operations to perform VAD are implemented directly in hardware (e.g., control or processing circuitry) of the accelerometer 14. As such, a separate, dedicated microcontroller to perform VAD is unnecessary. In addition, in some embodiments, the bone conduction accelerometer 16 may be turned off when not in use or even be removed from the device 10.

Figure 2:
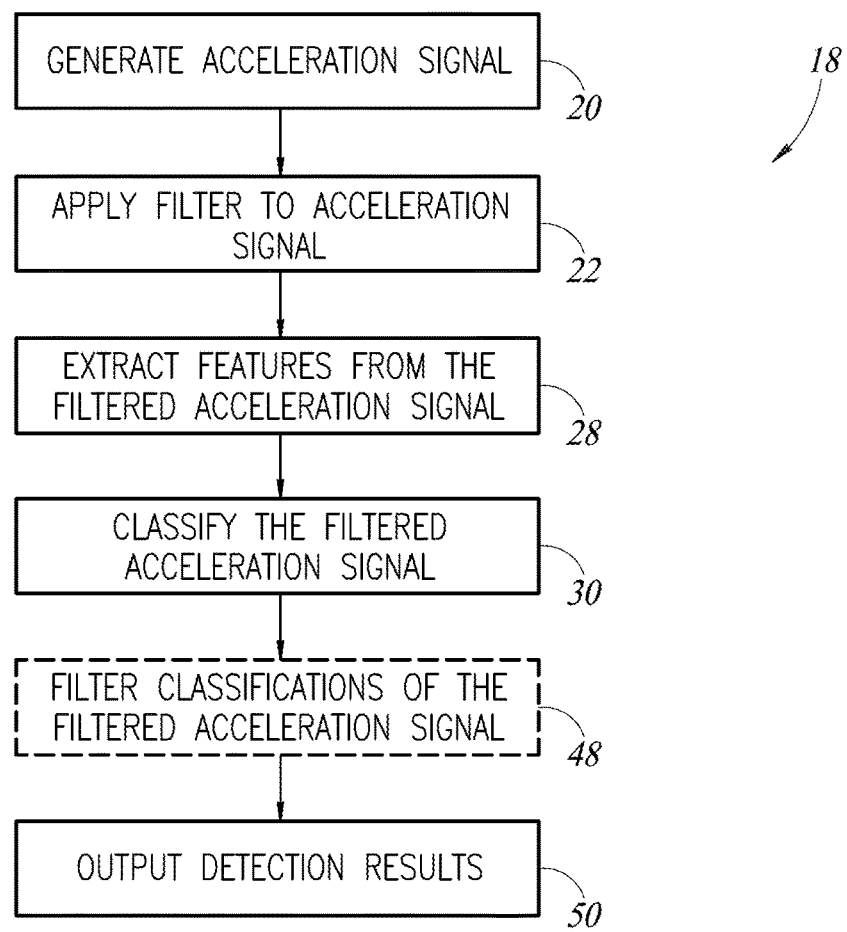
FIG. 2 is a flow diagram of a method of detecting a presence or absence of speech according to an embodiment disclosed herein.

FIG. 2 is a flow diagram of a method 18 of detecting a presence or absence of speech according to an embodiment disclosed herein.

In block 20, the accelerometer 14 measures acceleration of the device 10, and generates an acceleration signal that indicates the measured accelerations.

The acceleration signal is indicative of bone vibration signals propagating through the human body (e.g., bone and tissue vibrations through the jaw or ear canal) that are caused by a user's voice. As discussed above, the accelerometer 14 may measure acceleration along a single axis or multiple axes.

In block 22, the accelerometer 14 applies a filter to the acceleration signal generated in block 20, and generates a filtered acceleration signal.

The accelerometer 14 applies the filter to the acceleration signal in order to remove frequencies outside of the frequency range of voiced speech. A voiced speech of a typical adult male has a fundamental frequency between 85 hertz and 180 hertz, and that of a typical adult female has fundamental frequency between 165 hertz and 255 hertz. Thus, the accelerometer 14 may apply a high pass filter with for example, a cutoff frequency at 85 hertz to remove frequencies outside of the frequency range of voiced speech. Alternatively, the accelerometer 14 may apply a band pass filter with, for example, cutoff frequencies at 85 hertz and 255 hertz. As a result, the filtered acceleration signal generated in block 22 is indicative of acceleration measurements of vibrations signals caused by the user's voice, rather than vibrations signals caused by a surrounding environment or a user's movement.

Figure 3:
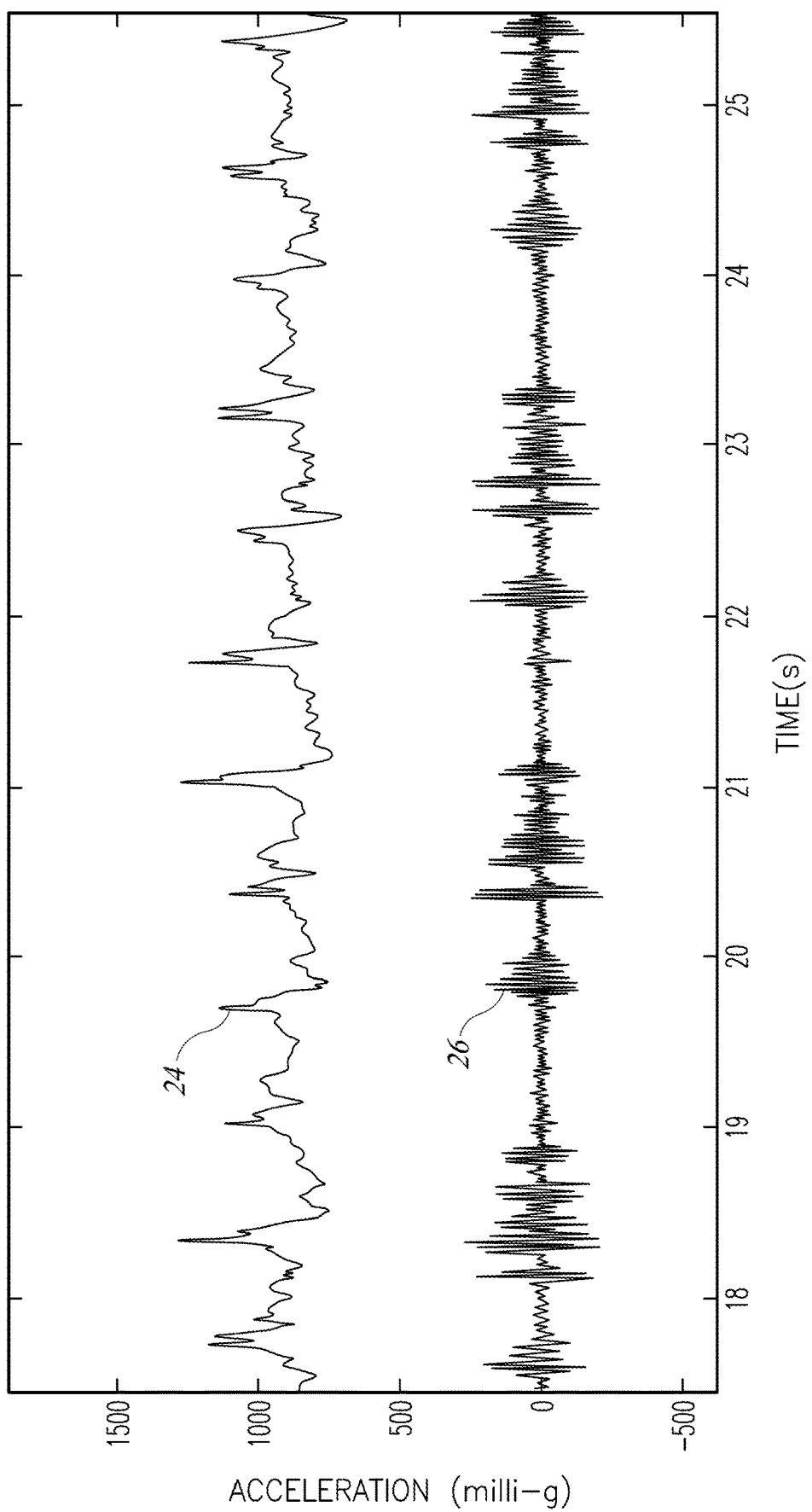
FIG. 3 shows an acceleration signal and a filtered acceleration signal according to an embodiment disclosed herein.

FIG. 3 shows an acceleration signal 24 and a filtered acceleration signal 26 according to an embodiment disclosed herein. In the embodiment shown in FIG. 3, a user is walking and talking concurrently. The horizontal axis represents time (seconds), and the vertical axis represents acceleration (milli-g).

The acceleration signal 24 is, for example, the acceleration signal generated in block 20, and the filtered acceleration signal 26 is the acceleration signal 24 after applying a filter in block 22. In the embodiment shown in FIG. 3, a high pass filter having a cutoff frequency at 85 hertz is applied to the acceleration signal 24. As discussed above, the filtered acceleration signal 26 represents acceleration measurements of vibrations signals caused by the user's voice because frequencies outside of the frequency range of voiced speech, which in this example are frequencies below 85 hertz, is removed from the acceleration signal 24 by the filter. As shown in FIG. 3, the filtered acceleration signal 26 includes many features (e.g., peaks, zero crossings, etc.) that are indicative of voiced speech.

Returning to FIG. 2, in block 28, the accelerometer 14 extracts features from the filtered acceleration signal generated in block 22 (e.g., the filtered acceleration signal 26 in FIG. 3).

The extracted features are distinguishing characteristics of the filtered acceleration measurements that are indicative of human speech. In one embodiment, features are extracted from the filtered acceleration signal in the time domain. For example, the accelerometer 14 determines at least one of the following calculations: a peak-to-peak calculation (e.g., a difference between the maximum amplitude and the minimum amplitude of the filtered acceleration signal in a period of time), a zero crossing calculation (e.g., a number of times the filtered acceleration signal crosses zero in a period of time), a peak count calculation (e.g., a total number of peaks in the filtered acceleration signal in a period of time), or a variance calculation (e.g., a variance of the filtered acceleration signal in a period of time). Other types of calculations are also possible.

In one embodiment, the features are extracted within a time window of the filtered acceleration signal that is defined based on a desired minimum latency of the VAD algorithm (e.g., the method 18). For example, the features may be calculated within a 0.1 seconds time window of the filtered acceleration signal.

In block 30, the accelerometer 14 classifies the filtered acceleration signal as either human speech or not human speech based on the features extracted in block 28. Stated differently, the accelerometer 14 detects the presence or absence of a user's voice by detecting whether the filtered acceleration signal, and in turn the acceleration signal, is a speech signal.

The accelerometer 14 uses a machine learning approach to classify the filtered acceleration signal as either human speech or not human speech. In one embodiment, the accelerometer 14 classifies the filtered acceleration signal as either human speech or not human speech using at least one of a decision tree, a neural network, and a support vector machine. Other machine learning techniques are also possible.

Learning/inference machines may fall under the technological titles of machine learning, artificial intelligence, artificial neural networks (ANN), probabilistic inference engines, accelerators, and the like. Classification problems, such as VAD and other signal processing applications, benefit from the use of learning/inference machines, such as deep convolutional neural networks (DCNN), fuzzy-logic machines, etc. For example, a DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer.

Figure 4:
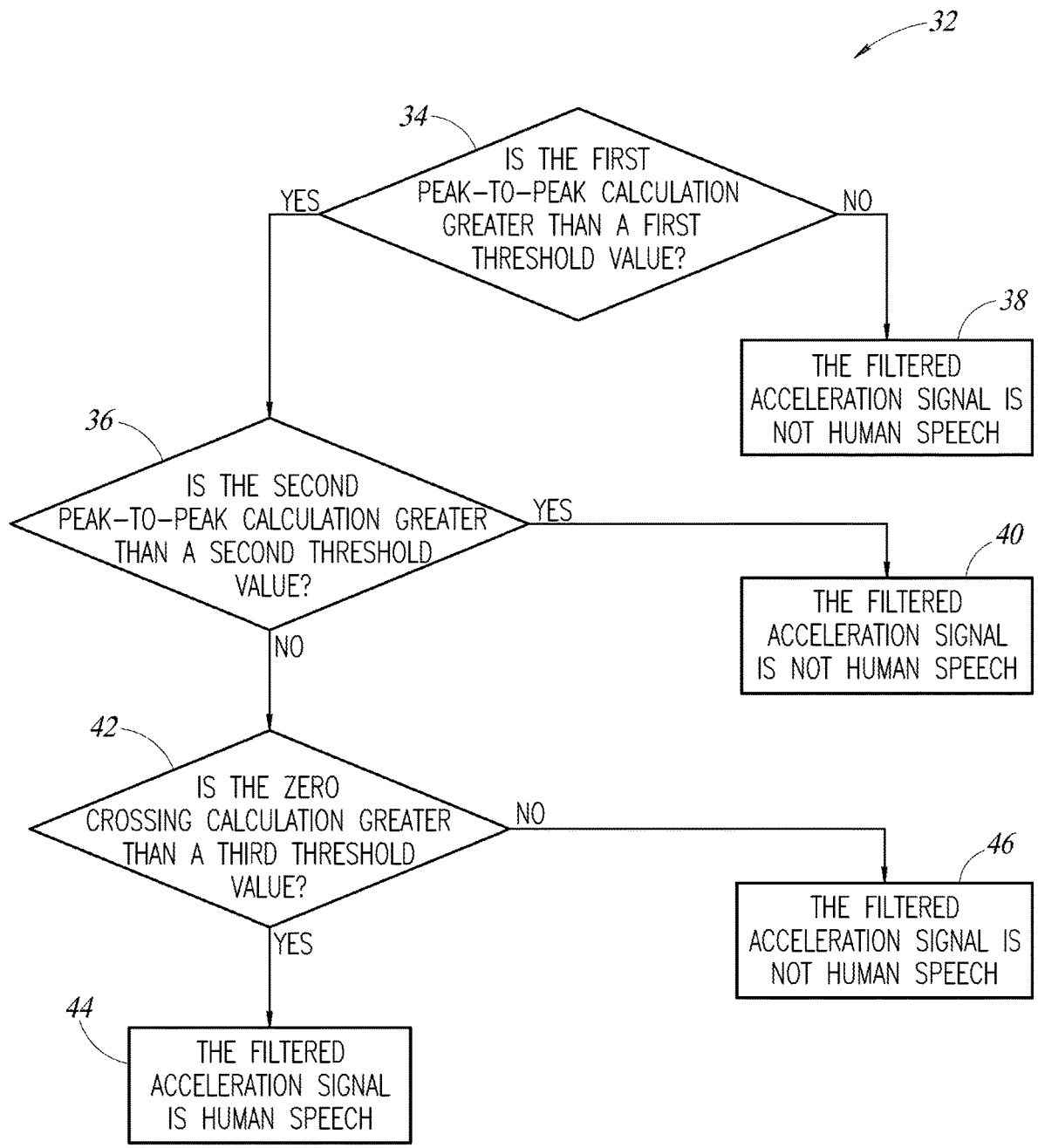
FIG. 4 is a decision tree according to an embodiment disclosed herein.

In one embodiment, the accelerometer 14 extracts different features along different axes of the device 10, and utilizes a decision tree to classify the filtered acceleration signal as either human speech or not human speech based on the extracted features along the different axes. For example, in block 28, the accelerometer 14 determines, within a selected time window (e.g., 60 milliseconds), a first peak-to-peak calculation of the filtered acceleration signal along a z-axis of the device 10, a second peak-to-peak calculation of the filtered acceleration signal along a x-axis of the device 10, and a zero crossing calculation of the filtered acceleration signal along a y-axis of the device 10. Subsequently, in block 30, the accelerometer classifies the filtered acceleration signal as either human speech or not human speech based on the first peak-to-peak calculation, the second peak-to-peak calculation, and the zero crossing calculation using a decision tree. FIG. 4 is a decision tree 32 according to an embodiment disclosed herein.

In block 34, the accelerometer 14 determines whether the first peak-to-peak calculation is greater than a first threshold value. If the first peak-to-peak calculation is greater than the first threshold value, the decision tree 32 moves to block 36. If the first peak-to-peak calculation is not greater than (i.e., is less than or equal to) the first threshold value, the decision tree 32 moves to block 38.

In block 38, the accelerometer 14 determines that the filtered acceleration signal is not human speech.

In block 36, the accelerometer 14 determines whether the second peak-to-peak calculation is greater than a second threshold value. If the second peak-to-peak calculation is greater than the second threshold value, the decision tree 32 moves to block 40. If the second peak-to-peak calculation is not greater than (i.e., is less than or equal to) the second threshold value, the decision tree 32 moves to block 42.

In block 40, the accelerometer 14 determines that the filtered acceleration signal is not human speech.

In block 42, the accelerometer 14 determines whether the zero crossing calculation is greater than a third threshold value. If the zero crossing calculation is greater than the third threshold value, the decision tree 32 moves to block 44. If the zero crossing calculation is not greater than (i.e., is less than or equal to) the third threshold value, the decision tree 32 moves to block 46.

In block 44, the accelerometer 14 determines that the filtered acceleration signal is human speech.

In block 46, the accelerometer 14 determines that the filtered acceleration signal is not human speech.

The first, second, and third threshold values may be set to any values. Further, although peak-to-peak calculations and a zero crossing calculation are used along three axes in the decision tree 32, any type of feature extracted in block 28 may be used (e.g., a peak-to-peak calculation, a zero crossing calculation, a peak count calculation, a variance calculation, etc.) along any number of axes.

Returning to FIG. 2, in block 48, the accelerometer 14 uses a meta-classifier to filter classifications of the filtered acceleration signal in block 30. The accelerometer 14 processes classifications of the filtered acceleration signal to remove or reduce false positives or false negatives.

In one embodiment, the accelerometer 14 reduces false detections of the filtered acceleration signal being human speech by maintaining a first count value. The first count value is a total number of times the accelerometer 14 classified the filtered acceleration signal as human speech. When the total number is equal to or greater than a first threshold count value, the accelerometer 14 determines that the filtered acceleration signal is human speech.

In one embodiment, the accelerometer 14 reduces false detections of the filtered acceleration signal not being human speech by maintaining a second count value. The second count value is a total number of times the accelerometer 14 classified the filtered acceleration signal as not being human speech. When the total number is equal to or greater than a second threshold count value, the accelerometer 14 determines that the filtered acceleration signal is not human speech.

Block 48 may also be removed from the method 18 (i.e., not performed) to reduce latency of the method 18.

In block 50, the accelerometer 14 outputs the detection results of the method 18. For example, the accelerometer 14 outputs, to the processing unit 12, a detection signal indicating either that human speech is present (i.e., the filtered acceleration signal is a speech signal) or human speech is not present (i.e., the filtered acceleration signal is not a speech signal).

In the embodiment where the method 18 includes block 48, the accelerometer 14 outputs a detection signal indicating that human speech is present in a case where the total number times the accelerometer 14 classified the filtered acceleration signal as human speech is equal to or greater than the first threshold count value. Conversely, the accelerometer 14 outputs a detection signal indicating that human speech is not present in a case where the total number of times the accelerometer 14 classified the filtered acceleration signal as not being human speech is equal to or greater than the second threshold count value.

In the embodiment where the method 18 does not include block 48, the accelerometer 14 outputs a detection signal indicating that human speech is present in a case where the accelerometer 14 classifies the filtered acceleration signal as human speech in block 30. Conversely, the accelerometer 14 outputs a detection signal indicating that human speech is not present in a case where the accelerometer 14 does not classify the filtered acceleration signal as human speech in block 30.

In one embodiment, the processing unit 12 activates or deactivates the bone conduction accelerometer 16 based on the detection signal received from the accelerometer 14. For example, the processing unit 12 activates the bone conduction accelerometer 16 in a case where detection signal indicates that human speech is present, and deactivates the bone conduction accelerometer 16 in a case where detection signal indicates that human speech is not present. Accordingly, power consumption of the device 10 may be reduced as the bone conduction accelerometer 16 is activated when human speech is detected, rather than being continuously on. In another embodiment, the accelerometer 14 directly activates or deactivates the bone conduction accelerometer 16, without intervention from the processing unit 12.

As discussed above, the program or algorithm to perform the method 18 of detecting a presence or absence of human speech is implemented directly in hardware of the accelerometer 14. However, the program or algorithm to perform the method 18 may be implemented in several different locations within the device 10. For example, the program or algorithm to perform the method 18 may be implemented in the processing unit 12 instead of the accelerometer 14. In this embodiment, the processing unit 12 is configured to detect a presence or absence of speech as described above with respect to FIG. 2. For example, the processing unit 12 may receive the acceleration signal generated in block 20 of the method 18, and subsequently perform blocks 22, 28, 30, 48, and 50. The processing unit 12 is also configured to receive and process an acceleration signal from the bone conduction accelerometer 16 and any other components included in the device 10.

The various embodiment disclosed herein provide a device and method for detecting presence or absence of human speech. The device and method utilize a low-power, low-cost accelerometer to perform VAD. As a result, the overall current consumption of the device disclosed herein is greatly reduced compared to devices that utilize a microphone and/or a bone conduction accelerometer for VAD. As such, the device and method disclosed herein are well suited for portable audio devices, such as TWS headphones, that have a limited power supply.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
an accelerometer configured to:
measure acceleration of the device along a plurality of axes;
generate a first acceleration signal based on the acceleration measured by the accelerometer;
apply a filter to the first acceleration signal;
determine a first characteristic of the filtered first acceleration signal along a first axis of the plurality of axes;
classify the first acceleration signal as a non-human speech signal in a case where the first characteristic does not satisfy a first determined condition;
determine a second characteristic of the filtered first acceleration signal along a second axis of the plurality of axes in a case where the first characteristic satisfies the first determined condition, the second characteristic being the same as the first characteristic;
classify the first acceleration signal as a non-human speech signal in a case where the second characteristic does not satisfy a second determined condition;
determine a third characteristic of the filtered first acceleration signal along a third axis of the plurality of axes in a case where the second characteristic satisfies the second determined condition, the third characteristic being different from the second characteristic, each of the first, second, and third characteristics being a peak-to-peak calculation, a zero crossing calculation, a peak count calculation, or a variance calculation;
classify the first acceleration signal as a non-human speech signal in a case where the third characteristic does not satisfy a third determined condition;
classify the first acceleration signal as a human speech signal in a case where the third characteristic satisfies the third determined condition;
determine a first count value that indicates a total number of times the first acceleration signal has been classified as a human speech signal; and
output a detection signal that indicates human speech is present or human speech is absent, the detection signal indicating human speech is present in a case where the first count value is equal to or greater than a first threshold count value; and
an operating system layer configured to receive the detection signal.

2. The device of claim 1, further comprising:
a bone conduction accelerometer configured to measure acceleration of the device, and generate a second acceleration signal based on the acceleration measured by the bone conduction accelerometer.

3. The device of claim 2 wherein the operating system layer is configured to activate or deactivate the bone conduction accelerometer based on the detection signal.

4. The device of claim 2 wherein the bone conduction accelerometer consumes a greater amount of current than the accelerometer.

5. The device of claim 1 wherein the accelerometer is configured to:
determine a second count value that indicates a total number of times the accelerometer classified the first acceleration signal as a non-human speech signal, the detection signal indicating human speech is absent in a case where the second count value is equal to or greater than a second threshold count value.

6. The device of claim 1 wherein the filter is a band pass filter or a high pass filter.

7. The device of claim 1 wherein the first acceleration signal is classified as a human speech signal or as a non-human speech signal by using at least one of a decision tree, a neural network, or a support vector machine.

8. A device, comprising:
- sensing circuitry configured to measure acceleration of the device along a plurality of axes, and generate an acceleration signal based on the acceleration measured by the sensing circuitry; and
- processing circuitry configured to:
- filter the acceleration signal;
- determine a first characteristic of the filtered acceleration signal along a first axis of the plurality of axes;
- classify the acceleration signal as a non-human speech signal in a case where the first characteristic does not satisfy a first determined condition;
- determine a second characteristic of the filtered acceleration signal along a second axis of the plurality of axes in a case where the first characteristic satisfies the first determined condition, the second characteristic being the same as the first characteristic;
- classify the acceleration signal as a non-human speech signal in a case where the second characteristic does not satisfy a second determined condition;
- determine a third characteristic of the filtered acceleration signal along a third axis of the plurality of axes in a case where the second characteristic satisfies the second determined condition, the third characteristic being different from the second characteristic, each of the first, second, and third characteristics being a peak-to-peak calculation, a zero crossing calculation, a peak count calculation, or a variance calculation;
- classify the acceleration signal as a non-human speech signal in a case where the third characteristic does not satisfy a third determined condition;
- classify the acceleration signal as a human speech signal in a case where the third characteristic satisfies the third determined condition; and
- determine a first count value that indicates a total number of times the acceleration signal has been classified as a human speech signal;
- output a detection signal that indicates a presence of a voice in a case where the first count value is equal to or greater than a first threshold count value.

9. The device of claim 8 wherein the device is an accelerometer.

10. The device of claim 8 wherein the acceleration signal is filtered with a band pass filter or a high pass filter.

11. The device of claim 8 wherein the acceleration signal is classified as a human speech signal or as a non-human speech signal by using at least one of a decision tree, a neural network, or a support vector machine.

12. A method, comprising:
- measuring acceleration of a device along a plurality of axes;
- generating an acceleration signal based on the measured acceleration;
- filtering the acceleration signal with a band pass filter or a high pass filter;
- determining a first characteristic of the filtered acceleration signal along a first axis of the plurality of axes;
- classifying the acceleration signal as a non-human speech signal in a case where the first characteristic does not satisfy a first determined condition;
- determining a second characteristic of the filtered acceleration signal along a second axis of the plurality of axes in a case where the first characteristic satisfies the first determined condition, the second characteristic being the same as the first characteristic;
- classifying the acceleration signal as a non-human speech signal in a case where the second characteristic does not satisfy a second determined condition;
- determining a third characteristic of the filtered acceleration signal along a third axis of the plurality of axes in a case where the second characteristic satisfies the second determined condition, the third characteristic being different from the second characteristic, each of the first, second, and third characteristics being a peak-to-peak calculation, a zero crossing calculation, a peak count calculation, or a variance calculation;
- classifying the acceleration signal as a non-human speech signal in a case where the third characteristic does not satisfy a third determined condition;
- classifying the acceleration signal as a human speech signal in a case where the third characteristic satisfies the third determined condition;
- determining a first count value that indicates a total number of times the acceleration signal has been classified as a human speech signal; and
- outputting a detection signal that indicates a presence of a voice in a case where the first count value is equal to or greater than a first threshold count value.

13. The method of claim 12 wherein the method is performed by an accelerometer.

14. The method of claim 12 wherein the acceleration signal is classified as a human speech signal or as a non-human speech signal by using at least one of a decision tree, a neural network, or a support vector machine.

* * * * *